(12) United States Patent
Lin et al.

(10) Patent No.: US 12,532,331 B2
(45) Date of Patent: Jan. 20, 2026

(54) USER EQUIPMENT AND METHOD FOR UNIFIED TCI STATE OPERATION

(71) Applicant: SHARP KABUSHIKI KAISHA, Sakai (JP)

(72) Inventors: Wan-Chen Lin, Taipei (TW); Chia-Hung Lin, Taipei (TW); Mei-Ju Shih, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 272 days.

(21) Appl. No.: 18/233,207

(22) Filed: Aug. 11, 2023

(65) Prior Publication Data

US 2024/0057111 A1 Feb. 15, 2024

Related U.S. Application Data

(60) Provisional application No. 63/397,249, filed on Aug. 11, 2022.

(51) Int. Cl.
*H04W 72/23* (2023.01)
*H04W 72/1263* (2023.01)
(Continued)

(52) U.S. Cl.
CPC ..... *H04W 72/232* (2023.01); *H04W 72/1263* (2013.01); *H04W 76/20* (2018.02)

(58) Field of Classification Search
CPC ........... H04W 72/232; H04W 72/1263; H04W 76/20; H04L 5/0044; H04L 5/0048; H04L 5/0053; H04L 5/0094
See application file for complete search history.

(56) References Cited

U.S. PATENT DOCUMENTS

2021/0360601 A1 11/2021 Sakhnini et al.
2022/0225369 A1* 7/2022 Park ............... H04W 72/0453
2025/0047538 A1* 2/2025 Dong ................. H04L 5/0094

FOREIGN PATENT DOCUMENTS

CN 114788328 A 7/2022
EP 3961960 A2 3/2022
(Continued)

OTHER PUBLICATIONS

Intel Corporation, "On Unified TCI framework for multi-TRP", 3GPP TSG RAN WG1 #109-e, R1-2204785, May 20, 2022 (May 20, 2022).

(Continued)

*Primary Examiner* — Steven Hieu D Nguyen
(74) *Attorney, Agent, or Firm* — ScienBiziP, P.C.

(57) ABSTRACT

A method for a unified Transmission Configuration Indication (TCI) state operation performed by a user equipment (UE) is provided. The method includes receiving a first Radio Resource Control (RRC) configuration for configuring a first set of TCI states and a second set of TCI states; receiving a first indication for associating the first set of TCI states with a first channel, the first channel including a Physical Downlink Control Channel (PDCCH); receiving a second indication for associating the second set of TCI states with a second channel, the second channel being scheduled by first Downlink Control Information (DCI) received on the first channel; receiving a third indication for indicating at least one third TCI state to be applied on the second channel; and transmitting or receiving the second channel after applying the at least one third TCI state.

20 Claims, 4 Drawing Sheets

(51) Int. Cl.
*H04W 72/232* (2023.01)
*H04W 76/20* (2018.01)

(56) References Cited

FOREIGN PATENT DOCUMENTS

| | | |
|---|---|---|
| EP | 4213585 A1 | 7/2023 |
| WO | 2022054248 A1 | 3/2022 |
| WO | 2022147815 A1 | 7/2022 |

OTHER PUBLICATIONS

Xiaomi: "Unified TCI framework extension for multi-TRP", R1-2203793, 3GPP TSG RAN WG1 #109-e, e-Meeting, May 9-20, 2022.

* cited by examiner

USER EQUIPMENT AND METHOD FOR UNIFIED TCI STATE OPERATION

CROSS-REFERENCE TO RELATED APPLICATION(S)

The present disclosure claims the benefit of and priority to U.S. Provisional Patent Application Ser. No. 63/397,249, filed on Aug. 11, 2022, entitled "METHOD AND APPARATUS FOR CHANNEL INDICATION FOR UNIFIED TCI FRAMEWORK UPON MULTI-TRP SCHEME," the content of which is hereby incorporated herein fully by reference into the present disclosure for all purposes.

FIELD

The present disclosure is related to wireless communication and, more specifically, to a user equipment (UE) and method for a unified Transmission Configuration Indication (TCI) state operation in cellular wireless communication networks.

BACKGROUND

Various efforts have been made to improve different aspects of wireless communication for cellular wireless communication systems, such as 5th Generation (5G) New Radio (NR), by improving data rate, latency, reliability, and mobility. The 5G NR system is designed to provide flexibility and configurability to optimize network services and types, accommodating various use cases, such as enhanced Mobile Broadband (eMBB), massive Machine-Type Communication (mMTC), and Ultra-Reliable and Low-Latency Communication (URLLC). However, as the demand for radio access continues to increase, there exists a need for further improvements in the art.

SUMMARY

The present disclosure is related to a user equipment (UE) and a method for a unified Transmission Configuration Indication (TCI) state operation in cellular wireless communication networks.

In a first aspect of the present application, a method for a unified TCI state operation performed by a UE is provided. The method includes receiving a first Radio Resource Control (RRC) configuration for configuring a first set of TCI states and a second set of TCI states; receiving a first indication for associating the first set of TCI states with a first channel, the first channel including a Physical Downlink Control Channel (PDCCH); receiving a second indication for associating the second set of TCI states with a second channel, the second channel being scheduled by first Downlink Control Information (DCI) received on the first channel; receiving a third indication for indicating at least one third TCI state to be applied on the second channel; and transmitting or receiving the second channel after applying the at least one third TCI state.

In an implementation of the first aspect, the at least one third TCI state is associated with the second set of TCI states.

In another implementation of the first aspect, the second channel includes one of a Physical Downlink Shared Channel (PDSCH), a Physical Uplink Control (PUCCH), a Physical Uplink Shared Channel (PUSCH), a reference signal, a set of PDSCH repetitions, a set of PUCCH repetitions, a set of PUSCH repetitions, or a set of reference signal repetitions.

In another implementation of the first aspect, the second channel corresponds to a coherent joint transmission (CJT).

In another implementation of the first aspect, the method further includes receiving a second RRC configuration for enabling the CJT.

In another implementation of the first aspect, the first set of TCI states is identical to the second set of TCI states.

In another implementation of the first aspect, the second channel includes a downlink (DL) channel.

In another implementation of the first aspect, the second channel includes an uplink (UL) channel.

In another implementation of the first aspect, a number of the at least one third TCI state indicated by the third indication is different from a number of TCI states in the second set of TCI states.

In another implementation of the first aspect, the third indication is indicated per BandWidth Part (BWP).

In a second aspect of the present application, a UE for a unified TCI state operation is provided. The UE includes one or more processors and at least one memory coupled to at least one of the one or more processors, the at least one memory storing computer-executable instructions that, when executed by the at least one of the one or more processors, cause the UE to receive a first RRC configuration for configuring a first set of TCI states and a second set of TCI states; receive a first indication for associating the first set of TCI states with a first channel, the first channel including a PDCCH; receive a second indication for associating the second set of TCI states with a second channel, the second channel being scheduled by first DCI received on the first channel; receive a third indication for indicating at least one third TCI state to be applied on the second channel; and transmit or receive the second channel after applying the at least one third TCI state.

BRIEF DESCRIPTION OF THE DRAWINGS

Aspects of the present disclosure are best understood from the following detailed disclosure when read with the accompanying drawings. Various features are not drawn to scale. Dimensions of various features may be arbitrarily increased or reduced for clarity of discussion.

DESCRIPTION

Figure 1:
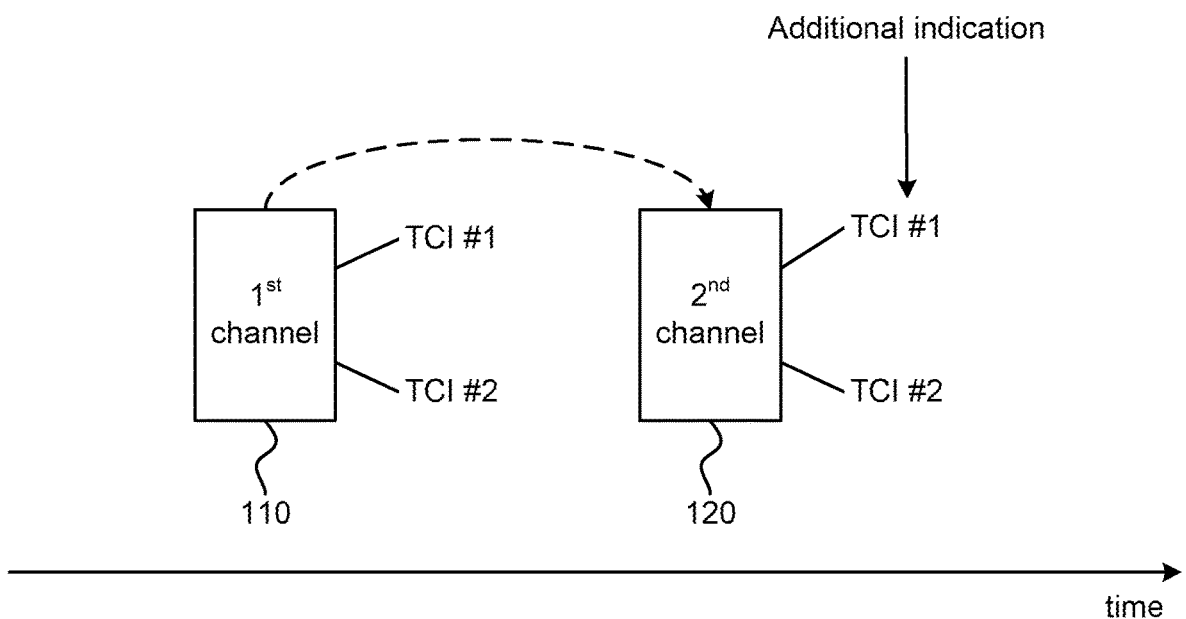
FIG. 1 is a diagram illustrating a TCI state operation applied to a multi-TRP scheme with a one-shot scheduling, according to an example implementation of the present disclosure.

Some abbreviations used in this disclosure include:

| Abbreviation | Full name |
| --- | --- |
| 3GPP | 3$^{rd}$ Generation Partnership Project |
| 5G | 5$^{th}$ Generation |
| ACK | Acknowledgment |
| AL | Aggregation Level |
| BFD | Beam Failure Detection |
| BS | Base Station |
| BW | Bandwidth |
| BWP | Bandwidth Part |
| CA | Carrier Aggregation |
| CC | Component Carrier |
| CCE | Control Channel Elements |
| CJT | Coherent Joint Transmission |
| CORESET | Control Resource Set |
| CP | Cyclic Prefix |
| CRC | Cyclic Redundancy Check |
| CSI | Channel State Information |
| CSI-RS | Channel State Information Reference Signal |
| DC | Dual Connectivity |
| DCI | Downlink Control Information |
| DL | Downlink |
| DM-RS | Demodulation Reference Signal |
| E-UTRA | Evolved Universal Terrestrial Radio Access |
| FDM | Frequency Division Multiplexing |
| FR | Frequency Range |
| HARQ | Hybrid Automatic Repeat Request |
| HARQ-ACK | HARQ Acknowledgement |
| ID | Identifier |
| IE | Information Element |
| LTE | Long Term Evolution |
| MAC | Medium Access Control |
| MAC CE | MAC Control Element |
| MCG | Master Cell Group |
| MCS | Modulation Coding Scheme |
| MN | Master Node |
| NR | New Radio |
| NW | Network |
| OFDM | Orthogonal Frequency Division Multiplexing |
| PBCH | Physical Broadcast Channel |
| PCell | Primary Cell |
| PCI | Physical Cell ID |
| PDCCH | Physical Downlink Control Channel |
| PDCP | Packet Data Convergence Protocol |
| PDSCH | Physical Downlink Shared Channel |
| PHY | Physical (layer) |
| PSCell | Primary SCG Cell |
| PTRS | Phase Tracking Reference signal |
| PUCCH | Physical Uplink Control Channel |
| PUSCH | Physical Uplink Shared Channel |
| QCL | Quasi-CoLocation |
| RA | Random Access |
| RAN | Radio Access Network |
| RF | Radio Frequency |
| RLC | Radio Link Control |
| RNTI | Radio Network Temporary Identifier |
| RRC | Radio Resource Control |
| RS | Reference Signal |
| RX | Reception |
| SCell | Secondary Cell |
| SCG | Secondary Cell Group |
| SFN | Single Frequency Network |
| SI | System Information |
| SN | Secondary Node |
| SpCell | Special Cell |
| SR | Scheduling Request |
| SRI | SRS Resource Indicator |
| SRS | Sounding Reference Signal |
| SS | Synchronization Signal |
| SSB | Synchronization Signal Block |
| TA | Timing Advance |
| TB | Transport Block |
| TCI | Transmission Configuration Indication |
| TDM | Time Division Multiplexing |
| TR | Technical Report |
| TRP | Transmission Reception Point |
| TRS | Tracking Reference Signal |
| TS | Technical Specification |
| TX | Transmission |
| UCI | Uplink Control Information |
| UE | User Equipment |
| UL | Uplink |
| URLLC | Ultra Reliable Low Latency Communication |

The following contains specific information related to implementations of the present disclosure. The drawings and their accompanying detailed disclosure are merely directed to implementations. However, the present disclosure is not limited to these implementations. Other variations and implementations of the present disclosure will be obvious to those skilled in the art.

Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For consistency and ease of understanding, like features may be identified (although, in some examples, not illustrated) by the same numerals in the drawings. However, the features in different implementations may be different in other respects and shall not be narrowly confined to what is illustrated in the drawings.

References to "one implementation," "an implementation," "example implementation," "various implementations," "some implementations," "implementations of the present application," etc., may indicate that the implementation(s) of the present application so described may include a particular feature, structure, or characteristic, but not every possible implementation of the present application necessarily includes the particular feature, structure, or characteristic. Further, repeated use of the phrase "in one implementation," or "in an example implementation," "an implementation," do not necessarily refer to the same implementation, although they may. Moreover, any use of phrases like "implementations" in connection with "the present application" are never meant to characterize that all implementations of the present application must include the particular feature, structure, or characteristic, and should instead be understood to mean "at least some implementations of the present application" includes the stated particular feature, structure, or characteristic. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series, and the equivalent.

The expression "at least one of A, B and C" or "at least one of the following: A, B and C" means "only A, or only B, or only C, or any combination of A, B and C." The terms "system" and "network" may be used interchangeably. The term "and/or" is only an association relationship for describing associated objects and represents that three relationships may exist such that A and/or B may indicate that A exists alone, A and B exist at the same time, or B exists alone. The character "/" generally represents that the associated objects are in an "or" relationship.

For the purposes of explanation and non-limitation, specific details, such as functional entities, techniques, protocols, and standards, are set forth for providing an understanding of the disclosed technology. In other examples, detailed disclosure of well-known methods, technologies, systems, and architectures are omitted so as not to obscure the present disclosure with unnecessary details.

Persons skilled in the art will immediately recognize that any network function(s) or algorithm(s) disclosed may be implemented by hardware, software, or a combination of software and hardware. Disclosed functions may correspond to modules which may be software, hardware, firmware, or any combination thereof.

A software implementation may include computer executable instructions stored on a computer-readable medium, such as memory or other type of storage devices. One or more microprocessors or general-purpose computers with communication processing capability may be programmed with corresponding executable instructions and perform the disclosed network function(s) or algorithm(s).

The microprocessors or general-purpose computers may include Application-Specific Integrated Circuits (ASICs), programmable logic arrays, and/or one or more Digital Signal Processor (DSPs). Although some of the disclosed implementations are oriented to software installed and executing on computer hardware, alternative implementations implemented as firmware, as hardware, or as a combination of hardware and software are well within the scope of the present disclosure. The computer-readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture such as a Long-Term Evolution (LTE) system, an LTE-Advanced (LTE-A) system, an LTE-Advanced Pro system, or a 5G NR Radio Access Network (RAN) typically includes at least one base station (B S), at least one UE, and one or more optional network elements that provide connection within a network. The UE communicates with the network such as a Core Network (CN), an Evolved Packet Core (EPC) network, an Evolved Universal Terrestrial RAN (E-UTRAN), a 5G Core (5GC), or an internet via a RAN established by one or more BSs.

A UE may include, but is not limited to, a mobile station, a mobile terminal or device, or a user communication radio terminal. The UE may be a portable radio equipment that includes, but is not limited to, a mobile phone, a tablet, a wearable device, a sensor, a vehicle, or a Personal Digital Assistant (PDA) with wireless communication capability. The UE is configured to receive and transmit signals over an air interface to one or more cells in a RAN.

The BS may be configured to provide communication services according to at least a Radio Access Technology (RAT) such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UMTS) that is often referred to as 3G based on basic wideband-code division multiple access (W-CDMA), high-speed packet access (HSPA), LTE, LTE-A, evolved LTE (eLTE) that is LTE connected to 5GC, NR (often referred to as 5G), and/or LTE-A Pro. However, the scope of the present disclosure is not limited to these protocols.

The BS may include, but is not limited to, a node B (NB) in the UMTS, an evolved node B (eNB) in LTE or LTE-A, a radio network controller (RNC) in UMTS, a BS controller (BSC) in the GSM/GERAN, an ng-eNB in an Evolved Universal Terrestrial Radio Access (E-UTRA) BS in connection with 5GC, a next generation Node B (gNB) in the 5G-RAN, or any other apparatus capable of controlling radio communication and managing radio resources within a cell. The BS may serve one or more UEs via a radio interface.

The BS is operable to provide radio coverage to a specific geographical area using a plurality of cells forming the RAN. The BS supports the operations of the cells. Each cell is operable to provide services to at least one UE within its radio coverage.

Each cell (often referred to as a serving cell) provides services to serve one or more UEs within its radio coverage such that each cell schedules the DL and optionally UL resources to at least one UE within its radio coverage for DL and optionally UL packet transmissions. The BS may communicate with one or more UEs in the radio communication system via the plurality of cells.

A cell may allocate sidelink (SL) resources for supporting Proximity Service (ProSe) or Vehicle to Everything (V2X) service. Each cell may have overlapped coverage areas with other cells.

In Multi-RAT Dual Connectivity (MR-DC) cases, the primary cell of a Master Cell Group (MCG) or a Secondary Cell Group (SCG) may be called a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), including the SpCell and optionally one or more Secondary Cells (SCells). An SCG may refer to a group of serving cells associated with the Secondary Node (SN), including the SpCell and optionally one or more SCells.

As previously disclosed, the frame structure for NR supports flexible configurations for accommodating various next generation (e.g., 5G) communication requirements, such as Enhanced Mobile Broadband (eMBB), Massive Machine Type Communication (mMTC), and Ultra-Reliable and Low-Latency Communication (URLLC), while fulfilling high reliability, high data rate, and low latency requirements. The Orthogonal Frequency-Division Multiplexing (OFDM) technology in the 3GPP may serve as a baseline for an NR waveform. The scalable OFDM numerology, such as adaptive sub-carrier spacing, channel bandwidth, and Cyclic Prefix (CP), may also be used.

Two coding schemes are considered for NR, specifically Low-Density Parity-Check (LDPC) code and Polar Code. The coding scheme adaption may be configured based on channel conditions and/or service applications.

At least DL transmission data, a guard period, and a UL transmission data should be included in a transmission time interval (TTI) of a single NR frame. The respective portions of the DL transmission data, the guard period, and the UL transmission data should also be configurable based on, for example, the network dynamics of NR. SL resources may also be provided in an NR frame to support ProSe services or V2X services.

Any two or more than two of the following paragraphs, (sub)-bullets, points, actions, behaviors, terms, or claims described in the present disclosure may be combined logically, reasonably, and properly to form a specific method.

Any sentence, paragraph, (sub)-bullet, point, action, behaviors, terms, or claims described in the present disclosure may be implemented independently and separately to form a specific method.

Dependency, e.g., "based on", "more specifically", "preferably", "in one embodiment", "in some implementations", etc., in the present disclosure is just one possible example which would not restrict the specific method.

"A and/or B" in the present disclosure may refer to either A or B, both A and B, at least one of A and B.

It should be noted that the term 'TRP' in the present disclosure may be replaced by 'beam' or 'panel'. It should be noted that the term 'overlap' may refer to time domain overlapping.

Examples of some selected terms in the present disclosure are provided as follows.

Antenna Panel: It may be assumed that an antenna panel is an operational unit for controlling a transmit spatial filter/beam. An antenna panel is typically consisted of a plurality of antenna elements. A beam can be formed by an antenna panel and in order to form two beams simultaneously, two antenna panels are needed. Such simultaneous beamforming from multiple antenna panels is subject to the UE capability. A similar definition for "antenna panel" may be possible by applying spatial receiving filtering characteristics.

BWP: A subset of the total cell bandwidth of a cell is referred to as a BWP, and bandwidth adaptation (BA) is achieved by configuring the UE with BWP(s) and telling the UE which of the configured BWPs is currently the active one. To enable BA on the PCell, the gNB configures the UE with UL and DL BWP(s). To enable BA on the SCells in case of the CA, the gNB configures the UE at least with the DL BWP(s) (e.g., there may be no BWP in the UL). For the PCell, the initial BWP is the BWP used for an initial access. For the SCell(s), the initial BWP is the BWP configured for the UE to first operate at the SCell activation. The UE may be configured with a first active uplink BWP, for example, by a firstActiveUplinkBWP IE. If the first active uplink BWP is configured for an SpCell, the firstActiveUplinkBWP IE field may contain the ID of the UL BWP to be activated upon performing the RRC (re-)configuration. If the firstActiveUplinkBWP IE field is absent, the RRC (re-)configuration may not impose a BWP switch. If the first active uplink BWP is configured for an SCell, the firstActiveUplinkBWP IE field may contain the ID of the UL BWP to be used upon the MAC-activation of an SCell.

TCI state: A TCI state may contain parameters for configuring a QCL relationship between one or two reference signals and a target reference signal set. For example, a target reference signal set may be the DM-RS ports of the PDSCH, PDCCH, PUCCH or PUSCH. The one or two reference signals may include UL or DL reference signals. In NR Rel-15/16, the TCI state is used for DL QCL indication whereas spatial relation information is used for providing UL spatial transmission filter information for UL signal(s) or UL channel(s). Here, a TCI state may refer to information provided similar to spatial relation information, which could be used for UL transmission. In other words, from the UL perspective, a TCI state provides an UL beam information which may provide the information for a relationship between an UL transmission and a DL (or a UL) reference signals (e.g., CSI-RS, SSB, SRS, PTRS).

Panel: The UE panel information may be derived from the TCI state/UL beam indication information or from the network signaling.

Beam: The term "beam" here may be replaced with spatial filter. For example, when a UE reports a preferred gNB TX beam, the UE is essentially selecting a spatial filter used by the gNB. The term "beam information" may be used to provide information about which beam/spatial filter has been used/selected.

Multi-TRP: Multi-TRP is a feature that enables a gNB to communicate with a UE using more than one TRP, for example, to ensure reliability. Moreover, NR supports same data stream(s) received from multiple TRPs at least with an ideal backhaul, and different NR-PDSCH data streams received from multiple TRPs with both ideal and non-ideal backhauls. An ideal backhaul may allow single DCI to be transmitted via a PDCCH from one TRP to schedule data transmission (or information) to/from multiple TRPs (may also be referred to as single-DCI based multi-TRP/panel transmission). On the other hand, a non-ideal backhaul may require multiple DCIs to be carried in the PDCCH(s) to schedule data transmission (or information) corresponding to each TRP (may also be referred to as multi-DCI based multi-TRP/panel transmission). To enhance reliability for the system, at least one multi-TRP scheme may be applied to at least one channel/reference signal, for example, a multi-TRP based PDSCH operation, a multi-TRP based PDCCH operation, a multi-TRP based PUCCH operation, and/or a multi-TRP based PUSCH operation.

TDM based PDCCH repetition: For example, two PDCCHs may be linked together for the repetition of the same DCI format, the same DCI payload, the same number of CCEs, and/or the same number of candidates for each AL. The two PDCCHs may be in two search spaces associated with two CORESETs.

TDM based PDSCH repetition: PDSCH repetition refers to multiple PDSCHs that have the same TB and are associated with different TRPs. Slot-based PDSCH repetition corresponds to scheduling each repetitive PDSCH in individual slots. Non-slot-based PDSCH repetition corresponds to scheduling multiple repetitive PDSCHs within the same slot.

TDM based PUCCH repetition: PUCCH repetition refers to multiple PUCCHs with the same UCI content but corresponding to different beams. There are two types of PUCCH repetitions: inter-slot based PUCCH repetition and intra-slot based PUCCH repetition, which are categorized according to their timing and relate to all PUCCH formats. Inter-slot based PUCCH transmission corresponds to transmitting each repetitive PUCCH in individual slots. Intra-slot based PUCCH transmission corresponds to transmitting each repetitive PUCCH in individual slots and transmitting multiple repetitive PDSCHs within the same slot.

TDM based PUSCH repetition: PUSCH repetition refers to multiple PUSCHs with the same TB but corresponding to different TRPs. Slot-based PUSCH repetition corresponds to scheduling each repetitive PUSCH in an individual slot. Non-slot-based PUSCH repetition corresponds to scheduling multiple repetitive PUSCHs within the same slot.

FDM based PDSCH repetition: Multiple PDSCHs with the same TB but corresponding to two TCI states. These PDSCHs are allocated to non-overlapping frequency resources within a slot.

Multi-DCI based PDSCH scheme: Two PDCCHs from separate search spaces associated with different CORESET pool indexes that schedule the corresponding PDSCHs.

Single Frequency Network (SFN) based PDCCH scheme: a CORESET is associated with two different beams.

SFN based PDSCH scheme: a PDSCH is associated with two different beams.

TCI State:

A UE may be configured with a list including up to M TCI state configurations, where each TCI state may contain parameters for configuring at least one QCL relationship between one or more downlink reference signals and the DM-RS ports of the PDSCH, the DM-RS port of PDCCH, or the CSI-RS port(s) of a CSI-RS resource. The QCL types corresponding to each DL RS may be given, for example, by the higher layer (e.g., RRC layer), parameters for the at least one RS and may take one of the following values:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

Furthermore, a UE may be configured with a TCI state configuration that contains parameters for determining a UL TX spatial filter for the UL transmissions. More specifically, when signals transmitted from different antenna ports share channels with similar properties, the antenna ports are said to be QCL signals. Basically, the QCL concept is introduced to help the UE with a precise channel estimation, frequency offset error estimation, and synchronization procedures.

Unified TCI framework: To facilitate more efficient (lower latency and overhead) DL/UL beam management to support a larger number of configured TCI states, a unified TCI framework for beam indication may result in some benefits of low complexity and simplified controlling mechanisms. More specifically, through the unified indication, the DL or UL channels/signals may share the same indicated TCI state to reduce the signaling overhead, and different channels and/or reference signals may share similar channel properties. The unified indication may be used to indicate a common TCI state for the DL channels (e.g., including a PDCCH, PDSCH, and/or DL reference signal), a common TCI state for the UL channels (e.g., including a PUCCH, PUSCH, and/or UL reference signal), and/or a common TCI state for both DL and UL channels. The unified indication for a common TCI state for the DL channels may be referred to as a "DL only TCI state", a "DL TCI state" or a "DL only". The unified indication for a common TCI state for the UL channels may be referred to as a "UL only TCI state", a "UL TCI state" or a "UL only". The unified indication for a common TCI state for both DL and UL channels may be referred to as a "joint TCI state mode", a "joint TCI state" or a "joint indication". The "DL only TCI state" and "UL only TCI state" may also be referred to as a "separate TCI state mode" or a "separate TCI state", as opposed to the "joint TCI state mode" or "joint TCI state".

Unified TCI states may be indicated through an RRC message, a MAC CE, and/or the DCI. For example, the RRC message may indicate whether the unified framework is enabled, and the MAC CE may further indicate where to apply the unified TCI framework. In addition, the DCI may also include information for the unified TCI states to explicitly indicate the TCI state to the UE. In particular, the information contained in the MAC CE may refer to a serving cell index, a DL BWP index, a UL BWP index, the number of TCI states included in each TCI codepoint, transmission direction, and/or a TCI state index. However, when the unified TCI framework is applied to multiple TRPs, there is no further information to link the specific TCI states to the specific TRPs. Consequently, since multiple TRPs may correspond to different schemes, such as a TDM scheme, an FDM scheme, a multi-DCI scheme, and an SFN scheme, some potential impact may need to be considered when applying the unified TCI framework (e.g., including the DL only, UL only, and/or joint indication) to different schemes for multiple TRPs. The following cases are listed as possible scenarios where the unified TCI framework may be applied. Furthermore, the listed scenarios may correspond to an intra-cell or an inter-cell multi-TRP scheme. It should be noted that the disclosed implementations may not be limited to the following cases.

Single DCI based TDM PDSCH repetition
Single DCI based FDM PDSCH repetition
Multi-DCI based PDSCH
TDM PDCCH repetition
FDM PDCCH repetition
Single DCI based TDM PUSCH repetition
TDM PUCCH repetition
SFN based PDCCH scheme
SFN based PDSCH scheme
Single DCI based FDM PUSCH repetition
Multi-DCI based PUSCH
FDM PUCCH repetition
SFN based PUSCH scheme
SFN based PUCCH scheme When the unified TCI framework is applied to at least one multi-TRP scheme, some changes may be needed. The changes may include the association between the unified indication and at least one TRP, the mapping order of the indicated TCI states, the association between the unified indication and the respective channel, and/or the method of signaling for each channel. In the present disclosure, implementations for applying the unified TCI framework to the multi-TRP scheme are disclosed hereinafter.

FIG. 1 is a diagram 100 illustrating a TCI state operation applied to a multi-TRP scheme with a one-shot scheduling, according to an example implementation of the present disclosure. The first channel 110 may be a PDCCH, which may carry the DCI. The second channel 120 may be scheduled by the DCI received on the first channel 120. For example, the second channel 120 may be a PDSCH, a PUCCH, a PUSCH, or a reference signal. The UE may receive a first RRC configuration for configuring a first set of TCI states and a second set of TCI states. The UE may receive a first indication for associating the first set of TCI states, including TCI #1 and TCI #2, with the first channel 110. The UE may also receive a second indication for associating the second set of TCI states, including TCI #1 and TCI #2, with the second channel 120. The first indication may be received via an RRC message, a MAC CE, DCI, or a combination thereof Similarly, the second indication may be received via an RRC message, a MAC CE, DCI, or a combination thereof.

In FIG. 1, the first set of TCI states are identical to the second set of TCI states. In some implementations, the first channel 110 is a DL channel and the second channel 120 is also a DL channel. The scenario in which identical TCI states are applied to more than one DL channels only (not UL channels) may be referred to as a "separate TCI state mode" or a "DL only TCI state". In some implementations, the first channel 110 is a DL channel and the second channel 120 is a UL channel. The scenario in which identical TCI states are applied to at least one DL channel and at least one UL channel may be referred to as a "joint TCI state mode". It should be noted that the example shown in FIG. 1 is provided for illustrative purposes only and not intended to be restrictive. The first set of TCI states may also be different from the second set of TCI states in some implementations. For example, the second set of TCI states may include TCI #3 and TCI #4, instead of TCI #1 and TCI #2.

The UE may receive a third indication for indicating at least one TCI state to be applied on the second channel 120. The third indication is illustrated as an "additional indication" in FIG. 1 because the third indication is in addition to the first indication and the second indication received previously. For example, the third indication may indicate TCI #1, which is then applied to the second channel 120. The at least one TCI state indicated by the third indication may be associated with the second set of TCI states, which includes TCI #1 and TCI #2 in FIG. 1. The number of the TCI states indicated by the third indication (which equals one in FIG. 1) may be different from the number of the TCI states in the second set of TCI states (which equals two in FIG. 1). For example, the number of the TCI states indicated by the third indication may be smaller than the number of the TCI states in the second set of TCI states. In some implementations, the third indication may be indicated per BWP. For example, different BWPs may correspond to different TCI states applied by the second channel 120. For example, TCI #1 in FIG. 1 may be applied to the channels in the same BWP in which the second channel 120 is included.

In some implementations, the second channel 120 may correspond to a CJT. The UE may receive a second RRC configuration for enabling the CJT.

Figure 2:
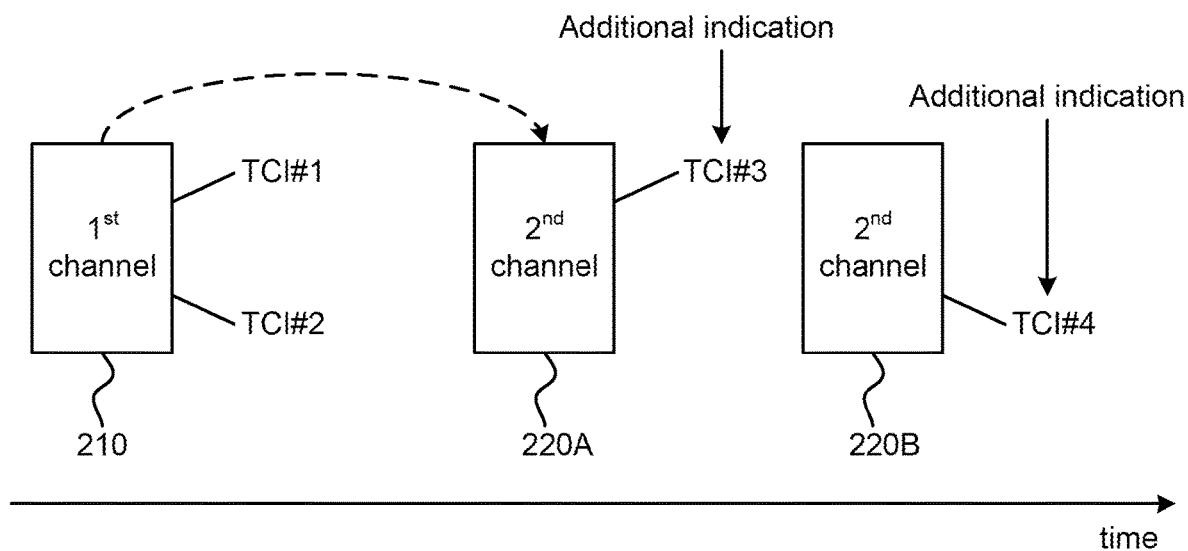
FIG. 2 is a diagram illustrating a TCI state operation applied to a multi-TRP scheme with transmission repetition, according to an example implementation of the present disclosure.

FIG. 2 is a diagram 200 illustrating a TCI state operation applied to a multi-TRP scheme with transmission repetition, according to an example implementation of the present disclosure. The first channel 210 may be a PDCCH, which may carry the DCI. The second channels 220A and 220B may be scheduled by the DCI received on the first channel 220. The second channels 220A and 220B may correspond to transmission repetition, such as PUSCH repetition or PDSCH repetition. For example, the second channels 220A and 220B may include a set of PDSCH repetitions, a set of PUCCH repetitions, a set of PUSCH repetitions, or a set of reference signal repetitions. The UE may receive a first RRC configuration for configuring a first set of TCI states and a second set of TCI states. The UE may receive a first indication for associating the first set of TCI states, including TCI #1 and TCI #2, with the first channel 210. The UE may also receive a second indication for associating the second set of TCI states, including TCI #3 and TCI #4, with the second channels 220A and 220B. The first indication and/or the second indication may be received via at least one of an RRC message, a MAC CE, and DCI.

In FIG. 2, the first set of TCI states are different from the second set of TCI states. The UE may receive a third indication for indicating at least one TCI state to be applied on the second channels 220A and 220B. The third indication is illustrated as an "additional indication" in FIG. 2 because the third indication is in addition to the first indication and the second indication received previously. For example, the third indication may indicate both TCI #3 and TCI #4, which are then applied to the second channels 220A and 220B alternately. The UE applies TCI #3 for transmitting/receiving the second channel 220A and applies TCI #4 for transmitting/receiving the second channel 220B. For example, the UE may transmit the second channels 220A and 220B if the second channels 220A and 220B correspond to PUSCH repetition; the UE may receive the second channels 220A and 220B if the second channel 220A and 220B correspond to PDSCH repetition. In some implementations, the number of the TCI states indicated by the third indication may be different from the number of the TCI states in the second set of TCI states.

In some implementations, the third indication may be indicated per BWP. In some implementations, the second channel 120 may correspond to a CJT. The UE may receive a second RRC configuration for enabling the CJT.

Figure 3:
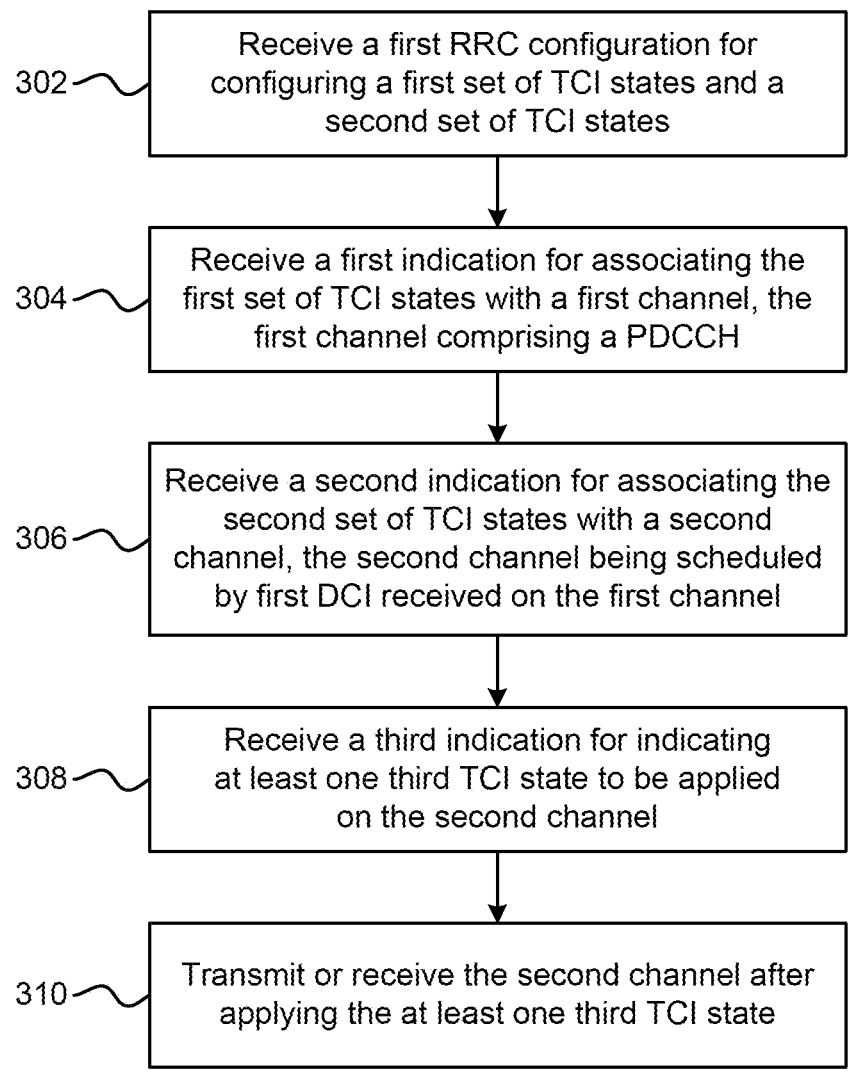
FIG. 3 is a flowchart illustrating a method/process for a unified TCI state operation performed by a UE, according to an example implementation of the present disclosure.

FIG. 3 is a flowchart 300 illustrating a method/process for a unified TCI state operation performed by a UE, according to an example implementation of the present disclosure. In action 302, the UE may receive a first RRC configuration for configuring a first set of TCI states and a second set of TCI states. According to the example illustrated in FIG. 1, the first set of TCI states may include TCI #1 and TCI #2, and the second set of TCI states may include TCI #1 and TCI #2. According to the example illustrated in FIG. 2, the first set of TCI states may include TCI #1 and TCI #2, and the second set of TCI states may include TCI #3 and TCI #4.

In action 304, the UE may receive a first indication for associating the first set of TCI states with a first channel (or a first set of channels). The first channel (or the first set of channels) may include a PDCCH. In action 306, the UE may receive a second indication for associating the second set of TCI states with a second channel (or a second set of channels). The second channel (or the second set of channels) may be scheduled by the first DCI received on the first channel (or the first set of channels). According to the example illustrated in FIG. 1, the first channel 110 schedules the second channel 120. According to the example illustrated in FIG. 2, the first channel 210 schedules the second channels 220A and 220B (a set of channels) for the transmission repetition.

The second channel (or the second set of channels) may include one of a PDSCH, a PUCCH, a PUSCH, a reference signal, a set of PDSCH repetitions, a set of PUCCH repetitions, a set of PUSCH repetitions, or a set of reference signal repetitions.

In action 308, the UE may receive a third indication for indicating at least one third TCI state to be applied on the second channel. According to the example illustrated in FIG. 1, the third indication indicates TCI #1. According to the example illustrated in FIG. 2, the third indication indicates TCI #3 and TCI #4. The at least one third TCI state may be associated with the second set of TCI states. For example, the at least one third TCI state may be selected from the second set of TCI states. In some implementations, the number of the at least one third TCI state indicated by the third indication may be different from the number of TCI states in the second set of TCI states.

In action 310, the UE may transmit or receive the second channel after applying the at least one third TCI state. For example, action 310 may correspond to the PDSCH reception or the PUSCH transmission.

The technical problem addressed by the method illustrated in FIG. 3 is the efficient management and configuration of TCI states for multiple channels within a communication system, particularly when one channel is scheduled based on the DCI received from another channel. The advantageous technical effect achieved by the method illustrated in FIG. 3 is the streamlined allocation and utilization of TCI states for multiple channels. This allows for a clearer instruction and higher flexibility on scheduling beam information between a BS and a UE in a multiple TRP based communication system, leading to enhanced performance and improved overall system efficiency.

In some implementations, the second channel (or the second set of channels) may correspond to a CJT. In some implementations, the UE may further receive a second RRC configuration for enabling the CJT.

In some implementations, the first set of TCI states may be identical to the second set of TCI states. An example of some such implementations is illustrated in FIG. 1. For a "separate TCI state", the first channel may include a first DL channel (e.g., a PDCCH) and the second channel may include a second DL channel (e.g., a PDSCH). For a "joint TCI state", the first channel may include a first DL channel (e.g., a PDCCH) and the second channel may include a first UL channel (e.g., a PUSCH).

In some implementations, the third indication may be indicated per BWP.

Procedure for TCI State Determination

An example procedure for TCI state determination may include the following steps. It should be noted that the order in which the process is described is not intended to be construed as a limitation.

Step 1: A UE may receive an RRC configuration from a BS to configure one or more TCI states. The RRC configuration may refer to a PDSCH-Config, a PUSCH-Config, a TCI-State, a TCI-Info, a joint TCI configuration, and/or a separate TCI configuration. The one or more TCI states may refer to joint TCI states, DL TCI states, and/or UL TCI states. Step 1 may correspond to step 302 in FIG. 3.

Step 2: The UE may receive, from the BS, a MAC CE that indicates one or more activated TCI states. The MAC CE may be used to activate or deactivate the TCI states configured by the RRC configuration. Step 2 described here may correspond to a possible implementation of step 304 or step 306 in FIG. 3.

Step 3: The UE may receive, from the B S, a DCI including one or more TCI codepoints, which indicate the applied TCI state for the scheduling corresponding to the DCI. The TCI codepoint may use a number of bits to indicate an index, and the index may correspond to one or more TCI states that are activated by the MAC CE. In the present disclosure, the term "scheduling" may refer to an assignment or transmission including the PDCCH, PDSCH, PUCCH, PUSCH, reference signals (CSI-RS, BFD-RS, SRS, TRS, PTRS, DMRS). Moreover, the scheduling may be a semi-persistent scheduling, a configured transmission, or a scheduling with the DCI indication. The applied TCI states are the TCI states associated with the configured/scheduled transmissions/receptions.

TRP/Panel Identification

In some implementations, different channel s/re source s/reference signals corresponding to the same TRP/panel may mean different channels/resources corresponding to the same SRI, SRS resource set, Transmission Precoding Matrix Indicator (TPMI), DL TCI state, UL TCI state, CORESET-PoolIndex, CORESET, CORESET group, TCI configuration, power control parameter, spatial relation information, search space, search space group, CSI-RS resource configuration, reference signal indication, panel indication, and/or joint TCI state.

There may be no explicit indication on TRP information in some implementations, and a default beam may be determined based on a (pre-)configured/(pre-)determined rule.

The TCI configuration may include, but is not limited to, a unified TCI state type, a joint TCI state, a UL TCI state, and/or a DL TCI state in some implementations.

The TCI configuration may refer to the RRC parameters that are listed for adding or releasing the TCI states in some implementations.

The TCI configuration may correspond to any scheduling configuration, such as a PDSCH-Config, a PUSCH-Config, a PUCCH-Config, a PUCCH-Configuration-List, and/or a PDCCH-Config in some implementations.

In some implementations, different channels/resources/reference signals corresponding to the same TRP/panel may mean that the channels/resources/reference signals are using the same spatial domain filter/setting as for the reception of an SS/PBCH block. The UE may apply the same parameters for determining the same spatial domain filter for the different channels/resources/reference signals corresponding to the same TRP/panel. For example, the same parameters may be included in the TCI state.

In some implementations, different channels/resources/reference signals corresponding to the same TRP/panel may mean that the channels/resources/reference signals are associated with a QCL assumption providing the same reference signal.

In some implementations, different channels/resources/reference signals corresponding to the same TRP/panel may mean that the channels/resources/reference signals are using the same spatial domain filter/setting as for reception of a periodic/semi-persistent/aperiodic CSI-RS resource. The UE may apply the same parameters for determining the same spatial domain filter for the different channels/resources/reference signals corresponding to the same TRP/panel. For example, the same parameters may be included in the TCI state.

In some implementations, different channels/resources/reference signals corresponding to the same TRP/panel may mean that the channels/resources/reference signals are indicated to be applied to the same spatial TX/RX domain filter/setting to transmit/receive toward/from the corresponding TRP/panel.

In some implementations, different channels/resources/reference signals corresponding to the same TRP/panel may mean that the channels/resources/reference signals are using the same spatial domain filter/setting as for the transmission of an SRS. The SRS resource may be for one of the following purposes: beam management, codebook-based channel sounding, or non-codebook-based channel sounding. For example, the SRS resource may serve the purpose of beam management.

In some implementations, different channels/resources corresponding to the same TRP/panel may mean that the channels/resources/reference signals are using the same spatial domain filter/setting as for PDCCH receptions corresponding to the same CORESET ID or the same CORESET group.

In some implementations, different channels/resources corresponding to the same TRP/panel may mean that the channels/resources/reference signals are using the same spatial domain filter/setting as for PDCCH receptions of which the associated CORESET index(es) correspond to the same CORESET pool index.

In some implementations, different channels/resources corresponding to the same TRP/panel may mean that the channels/resources/reference signals are indicated to the same set of power control parameters. The power control parameters may include, but not limited to, pathloss RS, Transmit Power Control (TPC) command, PO value, alpha value, and close loop index.

In some implementations, different channels/resources corresponding to the same TRP/panel may mean that the channels/resources/reference signals are associated with the same BFD RS set.

Unified TCI Indication

In some implementations, the at least one unified indication may refer to a common DL beam indication, a common UL beam indication, and/or a joint DL/UL beam indication. Specifically, the beam indication may refer to a TRP/panel indication.

The common DL beam indication (or separate DL beam indication) may correspond to the same DL TCI state, the same information of QCL assumption, the same CORESET index, the same CORESET pool index, the same search space index, the same search space group index, the same group index, the same RS index, the same BFD RS index/set, and/or the same DLorJoint TCI state.

The common UL beam indication (or separate UL beam indication) may correspond to the same UL TCI state, the same SRS resource set, the same spatial relation information, the same power control set, the same CORESET index, the same CORESET pool index, the same search space index, the same search space group index, the same group index, the same RS index, and/or the same DLorJoint TCI state.

The joint DL/UL beam indication may correspond to the same group index, and/or same DLorJoint TCI state.

The unified indication may refer to a number of activated/configured TCI states. The activated/configured TCI states may correspond to a group specific to the unified TCI framework. The UE may receive the unified indication via an RRC message, a MAC CE and/or the DCI from the serving cell. The serving cell may refer to a PCell, PSCell, SpCell, SCell, and/or a cell with the PCI that is different from the PCell.

Association Between at Least One Unified Indication and the Transmission/Reception Corresponding to at Least One TRP Single DCI Based Multi-TRP Operation In some implementations, an indication for a single DCI based multi-TRP operation may be indicated to a UE, where the indication may refer to an RRC configuration, a MAC CE, and/or a TCI codepoint included in the DCI. In addition, the TCI for the DCI may be determined based on the indicated TCI for the CORESET with which the PDCCH resource including the DCI is associated. It should be noted that the TCI for the DCI may be the applied TCI state associated with the PDCCH including the DCI or the TCI used for receiving the DCI. Several implementations are provided below regarding a case that more than one TCI states (e.g., unified indication) correspond to a scheduling or a series of scheduling, which is scheduled by the DCI. The more than one TCI states (e.g., unified indication) may include separate TCI states and/or a joint TCI state.

In some implementations, the UE may determine whether to apply the same TCI state for the DCI and the scheduled channels (e.g., PDSCH or PUSCH) and/or RSs (e.g., CSI-RSs or SRSs) based on the timing of the received indication. It should be noted that the TCI state for the DCI may refer to the applied TCI used by the DCI and the TCI state for the scheduled channels/RSs may refer to the applied TCI used by the scheduled channels/RSs.

The received indication may refer to the unified indication. The received indication may refer to the TCI state indication for the DCI. The received indication may refer to the TCI codepoint. The received indication may refer to the MAC CE that includes the TCI information.

The timing may correspond to a specific duration (e.g., x symbols, x slots, or x milliseconds) after receiving the DCI. The timing may correspond to a specific duration after receiving the unified indication. The timing may correspond to a specific duration before the starting symbol of the scheduling (e.g., the scheduled PDSCH, PUSCH, CSI-RS or SRS). For example, the starting symbol of the first scheduling among a series of scheduling (e.g., the first repetition of multiple repetitions). The timing may correspond to a specific duration before any starting symbol of each scheduling (e.g., each scheduled PDSCH, PUSCH, CSI-RS or SRS).

The timing may be determined according to the timeline requirement for each scheduling (e.g., each scheduled PDSCH, PUSCH, CSI-RS or SRS). The timing may be determined according to the configuration or a dynamic indication (e.g., DCI). The timing may be determined based on the timing of the received MAC CE that includes the TCI information. The timing may be determined based on the HARQ-ACK in response to the PDSCH containing TCI information (e.g., MAC CE).

In some implementations, at least one of the scheduling (e.g., the scheduled PDSCH, PUSCH, CSI-RS or SRS) may apply the same TCI state as the TCI state for the DCI. More specifically, the scheduler and the scheduling may correspond to the same TCI state. The TCI state may refer to the joint TCI state. The TCI state may refer to the DL TCI state. The TCI state may refer to the default TCI state. The joint/DL TCI state illustrated in the following may refer to the TCI for the scheduling. The default TCI state illustrated in the following may refer to the TCI for the scheduling.

In a case that the joint TCI state and/or the DL TCI state is indicated before the DCI reception in the time domain (e.g., the joint TCI state and/or the DL TCI state may be indicated through the configuration or the MAC CE), the DCI may not include the TCI codepoint for indicating the at least one TCI state to the scheduling.

In a case that the joint TCI state and/or the DL TCI state is indicated after the last symbol of the DCI and before the starting symbol of the scheduling (e.g., the joint TCI state and/or the DL TCI state may be indicated through the configuration or the MAC CE), the DCI may not include the TCI codepoint for indicating the at least one TCI state to the scheduling.

The default TCI state may refer to the TCI state associated with a CORESET including the DCI. The default TCI state may refer to the TCI state associated with the TCI state for a configured CORESET with the lowest index. The default TCI state may refer to the TCI state associated with the first TCI state of the more than one indicated TCI states associated with the DCI. The default TCI state may refer to the TCI state associated with the first activated TCI state of the more than one indicated TCI states associated with the DCI.

The TCI state of the DCI may refer to the lowest TCI state ID among the activated TCI states. The TCI state of the DCI may refer to the TCI state among the activated TCI states for unified TCI indication.

In some implementations, at least one DCI from one of at least two linked PDCCHs may correspond to a multi-TRP operation (e.g., the DCI corresponding to multi-TRP based PDCCH repetition, where the multi-TRP based PDCCH repetition may include at least two linked PDCCHs).

The indicated TCI state for the scheduling may correspond to the TCI state associated with a CORESET with the lowest index. The indicated TCI state for the scheduling may correspond to the TCI state associated with a CORESET including the DCI. The indicated TCI state for the scheduling may correspond to the lowest TCI codepoint or TCI codepoint with the lowest ID among the TCI codepoints. The indicated TCI state for the scheduling may correspond to one of DCI in the search space with the lowest ID.

The indicated TCI state for the scheduling may be replaced by the TCI state for the DCI. More specifically, a DCI received after the scheduling may be used to dynamically change/update the TCI state for the scheduling. More than one TCI states may correspond to respective TCI state for each DCI associated with the multi-TRP based PDCCH repetition.

The indicated TCI state for the scheduling may be different from the TCI state for the DCI.

The TCI codepoint used to indicate the TCI for the scheduling may be indicated by a DCI other than the DCI associated with the scheduling.

Two linked DCIs may respectively include one TCI field to provide the same joint or separate TCI state applied for the scheduling PUSCH if the time duration between the scheduling and the earlier received PDCCH is less than a threshold. The UE may apply the TCI state configured to the earlier received DCI or the later received DCI for the scheduling.

In some implementations, more than one TCI codepoints may be used to indicate the more than one TCI states.

In a case that two TCI codepoints are used, the first TCI codepoint may correspond to the first TRP/panel and the second TCI codepoint may correspond to the second TRP/panel. The first codepoint may refer to the lowest codepoint among the more than one TCI codepoints and the second codepoint may refer to the codepoint with a higher ID than the first codepoint. The first codepoint may refer to the lowest codepoint among the more than one TCI codepoints and the second codepoint may refer to the second lowest codepoint among the more than one TCI codepoints.

The more than one TCI codepoints may be included in the same DCI or in different DCIs.

One of the more than one TCI codepoints may correspond to more than one TRPs/panels. More specifically, in a case that two codepoints are used, the first codepoint may refer to the first TRP/panel and the second TRP/panel, and the second codepoint may refer to the third TRP/panel and the fourth TRP/panel. More specifically, in a case that two codepoints are used, the first codepoint may correspond to a group of TRPs/panels and the second codepoint may correspond to another group of TRPs/panels.

The number of TRPs/panels configured to a UE for the DL (e.g., PDSCH, PDCCH or CSI-RS) or UL transmission (e.g., PUSCH, PUCCH or SRS) may be provided by an RRC message, a MAC CE or a DCI field.

The transmission mode (e.g., single-TRP mode, multi-TRP mode or Coherent Joint Transmission (CJT)) may be configured to a UE by an RRC message, a MAC CE or a DCI field. If the transmission mode is associated with a single TRP operation, the number of TRPs/panels configured to a UE for DL or UL transmission may be 1. If the transmission mode is associated with a multi-TRP operation, the number of TRPs/panels configured to a UE for the DL or UL transmission may be 2. If the transmission mode is associated with the CJT, the number of TRPs/panels configured to a UE for the DL or UL transmission may be 2, 3, 4, or a positive integer greater than 2.

A UE may be indicated whether to perform the CJT or whether the CJT is enabled by an RRC message, a MAC CE, or a DCI field. For example, the UE may receive an RRC configuration for enabling the CJT. If the UE is configured to perform the CJT or the CJT is enabled, the UE may further be indicated the number of TRPs/panels configured for the DL or UL transmission via an RRC message, a MAC CE or a DCI field.

The more than one TCI codepoints may correspond to at least one of a joint TCI state and a separate TCI state. For instance, one of the codepoints may be used to indicate a DL TCI state for at least one DL scheduling and the other codepoint may be used to indicate a UL TCI state for at least one UL scheduling. For instance, one of the codepoints may be used to indicate a DL TCI state for at least one DL scheduling and the other codepoint may be used to indicate a joint TCI state to replace/change the indicated DL TCI state/UL TCI state and be applied to the following DL and UL scheduling. Alternatively, the joint TCI state may be replaced/changed by the DL TCI state or the UL TCI state.

In a case that at least two codepoints are used, the first codepoint may correspond to the reception of the DCI with an earlier occasion, and the second codepoint may correspond to the reception of the DCI with a later occasion.

In a case that at least two codepoints are used, the first codepoint corresponding to the DCI with the earlier occasion may refer to the DL TCI state or the UL TCI state and the second codepoint corresponding to the DCI with the later occasion may refer to the joint TCI state. It should be noted that the earlier occasion and the later occasion may be configured within a slot or in different slots.

In a case that at least two codepoints are used, the first codepoint corresponding to the DCI with the earlier occasion may refer to the joint state and the second codepoint corresponding to the DCI with the later occasion may refer to the DL TCI state or UL TCI state.

The lowest codepoint among the TCI codepoints may be the joint TCI state. Alternatively, the lowest codepoint among the TCI codepoints may be the DL TCI state or UL TCI state.

The more than one TCI codepoints may correspond to both separate and joint TCI indication. The choice of which indication is applied may depend on UE/gNB implementation. The choice of which indication is applied may depend on an RRC configuration.

In some implementations, a single TCI codepoint may be used to indicate the more than one TCI states.

The first activated TCI state (which may correspond to the first octet in the MAC CE) may correspond to the first TRP and the second activated TCI state may correspond to the second TRP. The first activated TCI state and the second TCI state may be indicated through the single codepoint. More specifically, codepoint '000' may indicate the first activated TCI state associated with the first TRP and the second activated TCI state associated with the second TRP.

In a case that two activated TCI states are indicated, one of the active TCI states may correspond to a separate TCI state and one of the active TCI states may correspond to a joint TCI state.

The single TCI codepoint may be included in the DCI associated with the scheduling or may be included in another DCI, which may be a DCI specifically used for beam indication or a DCI from one of the linked PDCCH.

In some implementations, in a case that at least two unified TCI are indicated, the scheduling within the first period may correspond to the first unified TCI state associated with the first TRP/panel and the scheduling within the second period may correspond to the second unified TCI state associated with the second TRP/panel.

Each period may be configured by a higher layer (e.g., RRC parameter or RRC configuration). The UE may be configured with the value of each period by the higher layer (e.g., RRC layer, RRC parameter, RRC configuration). Each period may be determined according to the UE capability. For example, among the configured/received at least one values for the periods, the UE may determine at least one of them based on the UE capability.

Each period may be determined according to the predefined rules. The unit of the period may be a slot, a half slot, a symbol, a number of symbols, a sub-frame, a frame, seconds, and/or milliseconds. Each period may be determined according to the periodicity of PDCCH, configured transmission/reception, and/or RS. The first period and the second period may overlap.

Multi-DCI Based Multi-TRP Operation

In some implementations, an indication for a multi-DCI based multi-TRP operation may be indicated to a UE, where the indication may refer to an RRC configuration, a MAC CE, and/or a TCI codepoint included in the DCI. Specifically, a multi-DCI based multi-TRP operation may use at least two DCIs to schedule the respective PDSCH/PUSCH and each DCI may correspond to different CORESET Pool Indexes or different CORESET groups. In addition, TCI for the DCI may be determined based on the indicated TCI for CORESET with which PDCCH resource including the DCI is associated. Several implementations are provided below regarding a case that more than one TCI states (e.g., unified indication) correspond to a scheduling or a series of scheduling, which is scheduled by a DCI. The more than one TCI states (e.g., unified indication) may include separate TCI state and/or joint TCI state.

In some implementations, the UE may determine whether to apply the same TCI state for the DCI and the scheduling based on the timing of the received indication. The received indication may refer to the unified indication from at least one DCI. The received indication may refer to the TCI state indication for at least one DCI. The received indication may refer to the TCI codepoint from at least one DCI. The received indication may refer to the MAC CE that includes the TCI information.

The timing may correspond to a specific duration (e.g., x symbols, x slots, or x milliseconds) after receiving a reference DCI. The reference DCI may refer to the DCI with earlier (or the earliest) occasion than the other DCI corresponding to the other TCI. The reference DCI may refer to the DCI with later (or the latest) occasion than the other DCI corresponding to the other TCI. The reference DCI may be determined based on an indication.

If the duration between the DCI and the scheduling is smaller than a specific value, the same TCI state may be applied to the DCI and the scheduling.

The timing may correspond to a specific duration after receiving the unified indication. The unified indication may refer to one of the at least two DCIs or another DCI other than the at least two DCIs. The timing may correspond to a specific duration before the starting symbol of the scheduling, where the scheduling from the at least two DCIs may fully or partially overlap in the time and/or frequency domain.

The timing may be determined according to the timeline requirement for each scheduling, where the timeline requirement may use the first DCI or the second DCI (of the at least two DCIs) as a reference. The timing may be determined according to the configuration or a dynamic indication (e.g., one of the at least two DCIs). The timing may be determined based on the timing of the received MAC CE that includes the TCI information. The timing may be determined based on the HARQ-ACK in response to the PDSCH containing the TCI information (e.g., MAC CE).

In some implementations, at least one of the scheduling may apply the same TCI state as the TCI state for one of the at least two DCIs. In other words, the UE may determine to transmit/receive the scheduling by using the TCI state that is the same as the TCI for the DCI. The TCI state may refer to the joint TCI state. The TCI state may refer to the DL TCI state. The TCI state may refer to the default TCI state. The TCI state may refer to a reference TCI. One of the at least one DCI may be used to indicate the joint TCI state and the other DCI may be used to indicate the separate TCI state. It should be noted that the default TCI state may be a TCI state for the scheduling when the TCI codepoint is not included in the DCI or the timeline requirement of TCI indication for the scheduling is not met.

In a case that the joint TCI state and/or the DL TCI state is indicated before the DCI, one of the at least two DCI may not include the TCI codepoint for indicating the at least one TCI state to the scheduling.

In a case that the joint TCI state and/or the DL TCI state is indicated after the last symbol of the DCI and before the starting symbol of the scheduling, the DCI may not include the TCI codepoint for indicating the at least one TCI state to the scheduling.

The default TCI state may refer to the TCI state associated with a CORESET including the DCI, where the DCI may or may not be one of the at least two DCIs. The default TCI state may refer to the TCI state associated with the TCI state for a configured CORESET with the lowest index, where the configured CORESET may be associated with the lowest or the highest CORESET Pool Index. The default TCI state may refer to the TCI state associated with the TCI state of the DCI with the earliest or the latest occasion among the at least two DCI. The default TCI state may refer to the TCI state associated with the activated TCI state for a TCI state group, where the TCI state group may be associated with the first CORESET pool.

The TCI state of the DCI may refer to the lowest TCI state ID among the activated TCI states, where the activated TCI states may refer to the same CORESET pool or different CORESET pools. The TCI state of the DCI may refer to the TCI state among the activated TCI states for unified TCI indication associated with a specific CORESET pool. The TCI state of the DCI may be associated with the lowest search space ID among the search spaces configured for the multi-DCI based multi-TRP operation.

In some implementations, the first DCI among the at least two DCIs may correspond to the first unified indication and the second DCI among the at least two DCIs may correspond to the second unified indication. In addition, the first DCI and the first scheduling (e.g., a number of data streams mapped to each layer, the PDCCH, PDSCH, PUSCH, PUCCH and/or aperiodic or periodic RS) associated with the first DCI may share the first common TCI. The second DCI and the second scheduling associated with the second DCI may share the second common TCI. Alternatively, the applied TCI for the first DCI and the applied TCI for the first scheduling may be different. Further, the TCI association between the DCI and the scheduling may not be in order. For instance, the first DCI may be associated with the second scheduling and the second DCI may be associated with the first scheduling. If a DCI and a scheduling are associated, the same TCI may be applied for the reception of the DCI and reception/transmission of the scheduling.

The first and/or the second unified indication may be associated with a separate DL/UL TCI state and a joint TCI state simultaneously.

In a case that the first unified indication and the second unified indication are associated with a separate DL/UL TCI state and a joint TCI state, and the respective scheduling overlap each other in the time and/or frequency domain, the joint TCI state may be applied to the respective scheduling.

In a case that the first unified indication and the second unified indication are associated with a separate DL/UL TCI state and a joint TCI state, and the respective scheduling overlap each other in the time and/or frequency domain, the separate DL/UL TCI state may be applied to the respective scheduling.

In a case that the first unified indication and the second unified indication are associated with a separate DL/UL TCI state and a joint TCI state, and the respective scheduling overlap each other in the time and/or frequency domain, which TCI state to be applied may be further indicated.

The first unified indication may correspond to the TCI states associated with the lowest or the highest CORESET pool index.

Mapping Order of the Indicated TCI States

In some implementations, when more than one TCI states for the unified framework are indicated to a UE, the mapping order of the more than one TCI states may be configured/indicated/defined.

The mapping order may be determined by the UE based on the order of the TCI state index. More specifically, the TCI states may be mapped to the scheduling from the lowest index to the highest index or from the highest index to the lowest index.

The mapping order may be determined by the UE based on the configuration. The configuration may be associated with the TCI state configuration, the PDCCH/PDSCH/PUSCH/PUCCH/reference signal configuration, and/or the unified TCI configuration.

The configuration may indicate an explicit mapping order, such as a sequential mapping, a cyclical mapping, a half-half mapping, or a slot-based mapping.

The sequential mapping may mean that the first TCI state is mapped to the first and second scheduling and the second TCI state is mapped to the third and fourth scheduling, where each scheduling may correspond to a repetitive transmission. If a UE is configured with more than two schedulings, the sequential mapping may mean that the first TCI state is applied to the first and second schedulings and the second TCI state is applied to the third and fourth schedulings, and the same TCI state mapping pattern may continue in the remaining schedulings. If a UE is configured with two schedulings, the sequential mapping may mean that the first and second TCI states are applied to the first and second schedulings, respectively.

The cyclical mapping may mean that the first TCI state is mapped to the first scheduling and the second TCI state is mapped to the second scheduling, where each scheduling may correspond to a repetitive transmission. If a UE is configured with more than two schedulings, the cyclical mapping may mean that the first and second TCI states are applied to the first and second schedulings, respectively, and the same TCI state mapping pattern may continue in the remaining schedulings. An example of the cyclical mapping is illustrated in FIG. 2, where TCI #3 and TCI #4 are applied to the second channels 220A and 220B respectively.

The half-half mapping may mean that the first TCI state is mapped to the scheduling in the first half slot of a slot and the second TCI state is mapped to the scheduling in the second half slot of the slot, where each scheduling may correspond to a repetitive transmission.

The slot-based mapping may mean that the first TCI state is mapped to the scheduling in the first slot and the second TCI state is mapped to the scheduling in the second slot, where each scheduling may correspond to a repetitive transmission.

The mapping order may be determined by the UE based on the order of the received indications.

When the first TCI state is received earlier than the second TCI state, the first TCI state may be mapped to the scheduling and the second TCI state may be mapped to the next scheduling or may be ignored.

When the first TCI state and the second TCI state are received simultaneously, the TCI between the first TCI and the second TCI corresponding to the lowest TCI codepoint may be mapped to the scheduling and the other TCI state may be mapped to the next scheduling or may be ignored.

When the first TCI state and the second TCI state are received simultaneously, the TCI between the first TCI and the second TCI that is associated with the lowest CORESET may be mapped to the scheduling and the other TCI state may be mapped to the next scheduling or may be ignored.

Association Between the Unified Indication and Respective Channel

In some implementations, in a case that at least one multi-TRP scheme is applied to a first channel and a second channel, the indicated TCI states for the first channel and the second channel may correspond to a respective scheduling (e.g., respective PDCCH/PDSCH/PUSCH/RS), and the respective scheduling may apply at least one of the indicated TCI states. For example, the first channel may be a first PDCCH used to schedule a first scheduling and the second channel may be used to schedule a second scheduling. For example, the first channel may be a first PDSCH scheduled by a PDCCH, and the second channel may be a second PDSCH scheduled by the same PDCCH or a different PDCCH. For example, as shown in FIG. 1, the first channel may be a PDCCH used to schedule the second channel.

The first channel and the second channel may refer to the PDCCH, PDSCH, PUCCH, PUSCH, or any channel for DL/UL transmission.

The first channel and the second channel may be a part of transmissions with repetition and/or may be linked to each other. Each repetition of transmissions may include the same content (e.g., the same DCI content, the same UCI content, and/or the same TB). Each repetition of transmissions may correspond to the same pattern of resource allocation in each of configured time duration and/or frequency range. Each repetition of transmissions may be configured over consecutive symbols/slots. Each repetition of transmissions may be performed with different time durations or frequency ranges. Each repetition of transmissions may be configured with different MCSs. For example, two MCSs may be configured to a UE for N repetition of transmissions, N being a positive integer. Each repetition of transmissions may be configured with the same MCS. The UE may be indicated whether the first channel and the second channel are linked. For example, the UE may receive an indication regarding whether the first channel and the second channel are linked via an RRC message, a MAC CE, and/or DCI.

The first channel and the second channel may correspond to different contents and/or different TRPs/panels. The different contents may be used to indicate the same resource allocation.

The respective scheduling may refer to a single TRP based scheduling, PDCCH, PDSCH, PUCCH, PUSCH, or any channel for DL/UL transmission. An example of the single TRP based scheduling is illustrated in FIG. 1. For example, the first channel may refer to a multiple TRP based PDCCH (e.g., corresponding to two TCI states in FIG. 1), and the second channel may refer to a single TRP based PDSCH (e.g., corresponding to a single TCI state in FIG. 1).

The TCI state for the respective scheduling may be indicated from the first channel and/or the second channel. The UE may receive the indicated information of the TCI state for the corresponding scheduling on the first channel and/or the second channel. For example, the first channel and the second channel may correspond to a first PDCCH and a second PDCCH respectively. The first channel and the second channel may be used to schedule a set of scheduling (e.g., PDSCH, PUSCH, RS).

The TCI state for the respective scheduling may be bonded with the first channel or the second channel.

The TCI state for the respective scheduling (e.g., the second channel 120 in FIG. 1) may be further indicated and may be independent of the indicated TCI states for the first channel and the second channel. An example is illustrated in FIG. 3. In step 308, the UE may receive a third indication for indicating at least one specific TCI state to be applied. The third indication may be an additional indication as illustrated in FIG. 1 and FIG. 2.

It should be noted that the further indication may mean an indication other than the TCI indicated in advance. For example, the number of the TCI states for the respective scheduling indicated by the further indication may be different from the number of the indicated states for the first channel and the second channel.

The TCI state for the respective scheduling may be further indicated and may be independent of the indicated TCI states for the first channel and the second channel. It should be noted that the further indication may mean an indication other than the TCI that is indicated in advance. For example, the UE may determine which indicated TCI state is applied to the respective scheduling based on the timeline requirement.

In a case that a transmission in response to the respective scheduling corresponds to a single TRP, the TCI state for the transmission in response to the respective scheduling may be the same as the TCI state for the scheduling.

In a case that a transmission in response to the respective scheduling corresponds to a single TRP, the TCI state for the transmission in response to the respective scheduling may be the same as the TCI state for one of the indicated TCI states between the first channel and the second channel.

In a case that a transmission in response to the respective scheduling corresponds to a single TRP, the TCI state for the transmission in response to the respective scheduling may be further indicated.

In a case that at least one multi-TRP scheme is applied to at least a first channel and a second channel, the indicated TCI states for the first channel and the second channel may correspond to a respective scheduling, and the respective scheduling may apply the indicated TCI states to the sequential scheduling.

The sequential scheduling may correspond to more than one TCI states for the PDCCH, PDSCH, PUCCH, PUSCH, or any channel for DL/UL transmission.

The sequential scheduling may be a number of transmissions with repetition or a number of transmissions with the same resource allocation.

The sequential scheduling may apply the same TCI states as the indicated TCI states for the first channel and the second channel.

The applied TCI states for the sequential scheduling may be further indicated. It should be noted that the further indication may mean an indication other than the TCI indicated in advance.

In a case that a transmission (e.g., PUCCH) is in response to the sequential scheduling (e.g., a set of PDSCH repetitions), the transmission may apply the same TCI state as the TCI state for the sequential scheduling. In some implementations, the first channel (e.g., PDCCH), the respective scheduling, and the transmission may be associated with the same TCI state. In some implementations, at least two of the first channel, the second channel, the respective scheduling, and the transmission may be associated with the same TCI state.

In a case that at least one joint TCI state and at least one separate TCI state (e.g., DL TCI state or UL TCI state) are indicated to a channel, one of the at least one joint TCI state and the at least one separate TCI state may be prioritized.

In some implementations, the joint TCI state may have a high priority. For example, the joint TCI state may be associated with a lower index than that of the separate TCI state. For example, the separate TCI may be ignored.

In some implementations, the separate TCI state may have a high priority. For example, the separate TCI state may be associated with a lower index than that of the joint TCI state. For example, the joint TCI may be ignored.

In some implementations, a prioritization rule may be set to determine which TCI state is applied to the channel.

In a case that more than one joint TCI states and/or more than one separate TCI states are indicated to more than one channels, the indicated TCI states may be applied to each associated channel. The associated channels may refer to PDCCH, PDSCH, PUCCH, PUSCH, or any channel for DL/UL transmission.

An additional TCI indication for the associated channels may not be configured/indicated. The UE may apply the same TCI for the associated channels as the TCI state for corresponding CORESET or CORESET pool.

The associated channels may correspond to the same or different direction of transmission (e.g., DL or UL).

When at least one joint TCI state or at least one separate TCI state is indicated/received, the at least one channel may change the indicated TCI state dynamically.

An additional indication may be used to change or further indicate the received TCI. Furthermore, changing or further indicating the received TCI states may mean that changing the number of the received TCI states or selecting one the TCI states from the received TCI states. An example of the additional indication for changing or further indicating the received TCI states is illustrated as the third indication in step 308 of FIG. 3.

The additional indication may refer to the indication other than the unified indication.

The additional indication may refer to a DCI or a MAC CE. For example, in FIG. 3, the third indication received by the UE in step 308 may be a DCI or a MAC CE. A DCI codepoint, a DCI field, a DCI format, a DCI format with CRC scrambled by a particular RNTI may refer to the additional indication.

The additional indication may have higher priority than the unified indication.

The additional indication may be channel specific. For example, when the additional indication is indicated to a PDCCH, the UE may apply the TCI indicated by the additional indication for the subsequent PDCCH.

The additional indication may be scheduling specific. For example, when a unified TCI is indicated to a UE, some of scheduling may have their corresponding TCI indication independently.

The additional indication may be applied per BWP, per CC, or per CC list. For example, the third indication received by the UE in step 308 may be applied per BWP.

The UE may be configured by a higher layer regarding whether to change the received TCI. For example, the UE may receive an RRC message and/or MAC CE including the information of whether to change the received TCI.

The UE may be indicated whether to change the received TCI according to a UE capability. For example, the UE may determine whether to change the received TCI based on the UE capability.

Figure 4:
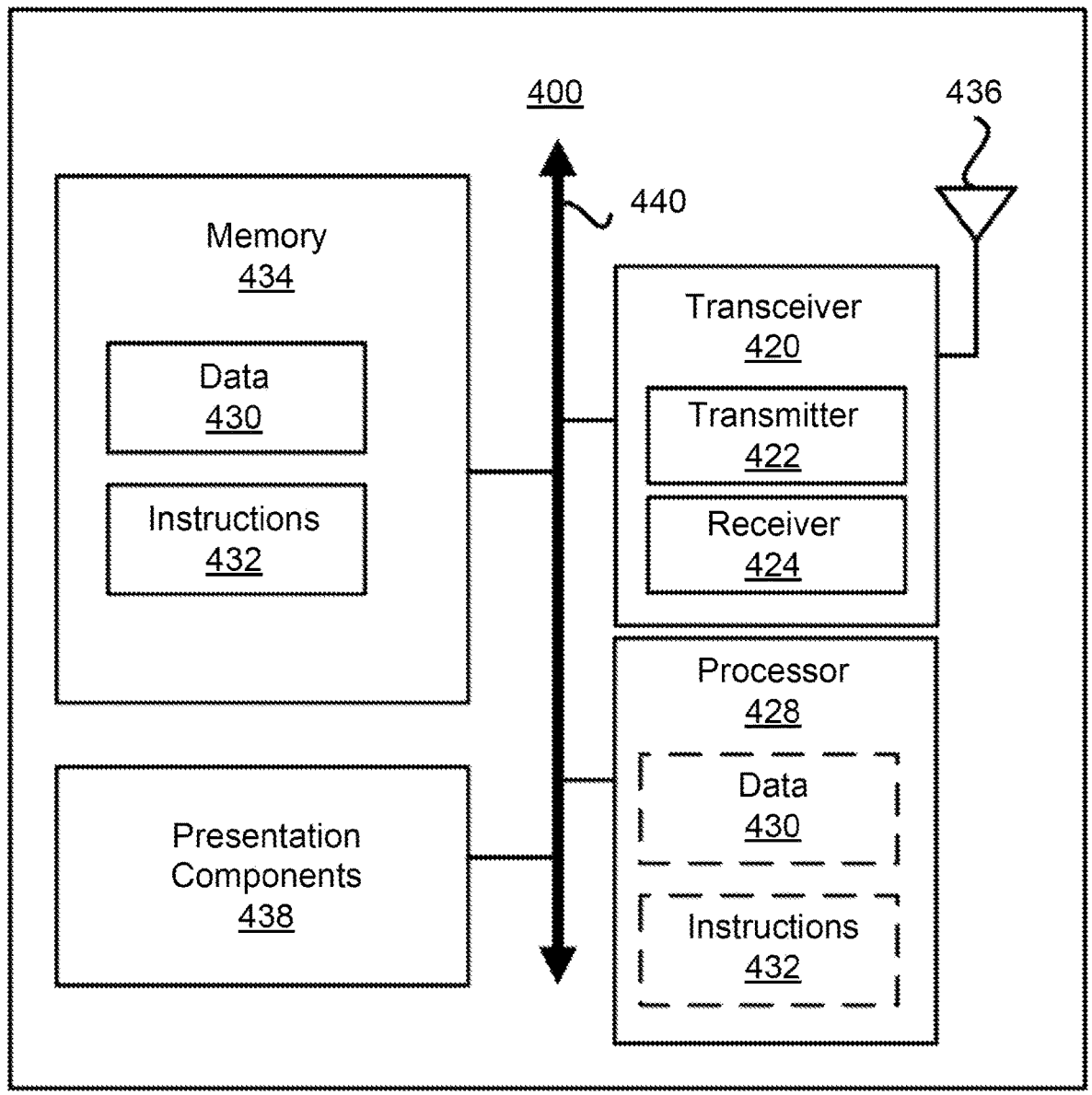
FIG. 4 is a block diagram illustrating a node for wireless communication, according to an example implementation of the present disclosure.

FIG. 4 is a block diagram illustrating a node 400 for wireless communication in accordance with various aspects of the present disclosure. As illustrated in FIG. 4, a node 400 may include a transceiver 420, a processor 428, a memory 434, one or more presentation components 438, and at least one antenna 436. The node 400 may also include a radio frequency (RF) spectrum band module, a BS communications module, a network communications module, and a system communications management module, Input/Output (I/O) ports, I/O components, and a power supply (not illustrated in FIG. 4).

Each of the components may directly or indirectly communicate with each other over one or more buses 440. The node 400 may be a UE or a BS that performs various functions disclosed with reference to FIGS. 1 through 3.

The transceiver 420 has a transmitter 422 (e.g., transmitting/transmission circuitry) and a receiver 424 (e.g., receiving/reception circuitry) and may be configured to transmit and/or receive time and/or frequency resource partitioning information. The transceiver 420 may be configured to transmit in different types of subframes and slots including, but not limited to, usable, non-usable, and flexibly usable subframes and slot formats. The transceiver 420 may be configured to receive data and control channels.

The node 400 may include a variety of computer-readable media. Computer-readable media may be any available media that may be accessed by the node 400 and include volatile (and/or non-volatile) media and removable (and/or non-removable) media.

The computer-readable media may include computer-storage media and communication media. Computer-storage media may include both volatile (and/or non-volatile media), and removable (and/or non-removable) media implemented in any method or technology for storage of information such as computer-readable instructions, data structures, program modules, or data.

Computer-storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer-storage media may not include a propagated data signal. Communication media may typically embody computer-readable instructions, data structures, program modules, or other data in a modulated data signal, such as a carrier wave, or other transport mechanisms and include any information delivery media.

The term "modulated data signal" may mean a signal that has one or more of its characteristics set or changed in such a manner as to encode information in the signal. Communication media may include wired media, such as a wired network or direct-wired connection, and wireless media, such as acoustic, RF, infrared, and other wireless media. Combinations of any of the previously listed components should also be included within the scope of computer-readable media.

The memory 434 may include computer-storage media in the form of volatile and/or non-volatile memory. The memory 434 may be removable, non-removable, or a combination thereof. Example memory may include solid-state memory, hard drives, optical-disc drives, etc. As illustrated in FIG. 4, the memory 434 may store a computer-readable and/or computer-executable instructions 432 (e.g., software codes) that are configured to, when executed, cause the processor 428 to perform various functions disclosed herein, for example, with reference to FIGS. 1 through 3. Alternatively, the instructions 432 may not be directly executable by the processor 428 but may be configured to cause the node 400 (e.g., when compiled and executed) to perform various functions disclosed herein.

The processor 428 (e.g., having processing circuitry) may include an intelligent hardware device, e.g., a Central Processing Unit (CPU), a microcontroller, an ASIC, etc. The processor 428 may include memory. The processor 428 may process the data 430 and the instructions 432 received from the memory 434, and information transmitted and received via the transceiver 420, the baseband communications module, and/or the network communications module. The processor 428 may also process information to send to the transceiver 420 for transmission via the antenna 436 to the network communications module for transmission to a CN.

One or more presentation components 438 may present data indications to a person or another device. Examples of presentation components 438 may include a display device, a speaker, a printing component, a vibrating component, etc.

In view of the present disclosure, it is obvious that various techniques may be used for implementing the disclosed concepts without departing from the scope of those concepts. Moreover, while the concepts have been disclosed with specific reference to certain implementations, a person of ordinary skill in the art may recognize that changes may be made in form and detail without departing from the scope of those concepts. As such, the disclosed implementations are to be considered in all respects as illustrative and not restrictive. It should also be understood that the present disclosure is not limited to the particular implementations disclosed and many rearrangements, modifications, and substitutions are possible without departing from the scope of the present disclosure.

What is claimed is:

1. A method for a unified Transmission Configuration Indication (TCI) state operation performed by a user equipment (UE), the method comprising:
    receiving a first Radio Resource Control (RRC) configuration for configuring a first set of TCI states and a second set of TCI states;
    receiving a first indication for associating the first set of TCI states with a first channel, the first channel comprising a Physical Downlink Control Channel (PDCCH);
    receiving a second indication for associating the second set of TCI states with a second channel, the second channel being scheduled by first Downlink Control Information (DCI) received on the first channel;
    receiving a third indication for indicating at least one third TCI state to be applied on the second channel; and
    transmitting or receiving the second channel after applying the at least one third TCI state.

2. The method of claim 1, wherein the at least one third TCI state is associated with the second set of TCI states.

3. The method of claim 1, wherein:
the second channel comprises one of a Physical Downlink Shared Channel (PDSCH), a Physical Uplink Control (PUCCH), a Physical Uplink Shared Channel (PUSCH), a reference signal, a set of PDSCH repetitions, a set of PUCCH repetitions, a set of PUSCH repetitions, or a set of reference signal repetitions.

4. The method of claim 1, wherein the second channel corresponds to a coherent joint transmission (CJT).

5. The method of claim 4, further comprising:
receiving a second RRC configuration for enabling the CJT.

6. The method of claim 1, wherein the first set of TCI states is identical to the second set of TCI states.

7. The method of claim 6, wherein the second channel comprises a downlink (DL) channel.

8. The method of claim 6, wherein the second channel comprises an uplink (UL) channel.

9. The method of claim 1, wherein a number of the at least one third TCI state indicated by the third indication is different from a number of TCI states in the second set of TCI states.

10. The method of claim 1, wherein the third indication is indicated per BandWidth Part (BWP).

11. A user equipment (UE) for a unified Transmission Configuration Indication (TCI) state operation, the UE comprising:
one or more processors; and
at least one memory coupled to at least one of the one or more processors, the at least one memory storing computer-executable instructions that, when executed by the at least one of the one or more processors, cause the UE to:
receive a first Radio Resource Control (RRC) configuration for configuring a first set of Transmission Configuration Indication (TCI) states and a second set of TCI states,
receive a first indication for associating the first set of TCI states with a first channel, the first channel comprising a Physical Downlink Control Channel (PDCCH);
receive a second indication for associating the second set of TCI states with a second channel, the second channel being scheduled by first Downlink Control Information (DCI) received on the first channel;
receive a third indication for indicating at least one third TCI state to be applied on the second channel; and
transmit or receive the second channel after applying the at least one third TCI state.

12. The UE of claim 11, wherein the at least one third TCI state is associated with the second set of TCI states.

13. The UE of claim 11, wherein:
the second channel comprises one of a Physical Downlink Shared Channel (PDSCH), a Physical Uplink Control (PUCCH), a Physical Uplink Shared Channel (PUSCH), a reference signal, a set of PDSCH repetitions, a set of PUCCH repetitions, a set of PUSCH repetitions, or a set of reference signal repetitions.

14. The UE of claim 11, wherein the second channel corresponds to a coherent joint transmission (CJT).

15. The UE of claim 14, wherein the computer-executable instructions, when executed by the at least one of the one or more processors, further cause the UE to:
receive a second RRC configuration for enabling the CJT.

16. The UE of claim 11, wherein the first set of TCI states is identical to the second set of TCI states.

17. The UE of claim 16, wherein the second channel comprises a downlink (DL) channel.

18. The UE of claim 16, wherein the second channel comprises an uplink (UL) channel.

19. The UE of claim 11, wherein a number of the at least one third TCI state indicated by the third indication is different from a number of TCI states in the second set of TCI states.

20. The UE of claim 11, wherein the third indication is indicated per BandWidth Part (BWP).

* * * * *